United States Patent [19]
Garland et al.

[11] Patent Number: 6,086,815
[45] Date of Patent: Jul. 11, 2000

[54] METHOD TO RESIZE SINTERED CERAMIC SUBSTRATES

[75] Inventors: James M. Garland, Middletown; Renee L. Weisman, Poughkeepsie, both of N.Y.

[73] Assignee: International Business Machines Corporation, Armonk, N.Y.

[21] Appl. No.: 09/304,292

[22] Filed: May 3, 1999

[51] Int. Cl.[7] .............................. B29B 17/00; B29C 71/00
[52] U.S. Cl. ............................................. 264/662; 264/343
[58] Field of Search ..................................... 264/343, 662, 264/664, 663, 19

[56] References Cited

U.S. PATENT DOCUMENTS

| | | | |
|---|---|---|---|
| 3,903,225 | 9/1975 | Jones et al. | 264/663 |
| 4,011,099 | 3/1977 | Gutsche | 134/7 |
| 4,104,345 | 8/1978 | Anderson et al. | 264/43 |
| 4,348,458 | 9/1982 | Otstot | 428/366 |

*Primary Examiner*—Christopher A. Fiorilla
*Attorney, Agent, or Firm*—Ira D. Blecker

[57] ABSTRACT

A method of expanding a sintered alumina substrate which includes the step, after conventional sintering, of heating the sintered alumina substrate to a temperature of about 1340 to 1380° C. and holding at the temperature for a predetermined time but no less than 15 minutes, the heating step causing the sintered alumina substrate to expand.

2 Claims, 5 Drawing Sheets

METHOD TO RESIZE SINTERED CERAMIC SUBSTRATES

BACKGROUND OF THE INVENTION

The present invention relates to the sintering of ceramic substrates and, more particularly, relates to the expanding of alumina ceramic substrates that have become undersized after sintering.

The use of alumina ceramic substrates, usually and preferably multilayered, in electronic applications is well known as demonstrated by, for example, Anderson et al. U.S. Pat. No. 4,104,345, the disclosure of which is incorporated by reference herein. Many different types of structures can be used, and a few of these structures are described below. For example, a multilayered ceramic substrate may comprise patterned metal layers which act as electrical conductors sandwiched between ceramic layers which act as insulators. The substrates may be designed with termination pads for attaching semiconductor chips, connector leads, capacitors, resistors, covers, etc. Interconnection between buried conductor levels can be achieved through vias formed by metal paste-filled holes in the individual ceramic layers formed prior to lamination, which, upon sintering will become a sintered dense metal interconnection of metal based conductor.

In general, conventional alumina ceramic structures are formed from alumina ceramic greensheets which are prepared by mixing a ceramic particulate, a thermoplastic polymeric binder, plasticizers and solvents. The ceramic particulate will usually contain alumina particles plus other additives such as silica, titania, chromia, magnesia and calcia. This composition is spread or cast into ceramic sheets or slips from which the solvents are subsequently volatilized to provide coherent and self-supporting flexible greensheets. After blanking, via formation, stacking and laminating, the green sheet laminates are eventually fired at temperatures sufficient to drive off the polymeric binder resin and sinter the ceramic particulates together into a densified ceramic substrate.

The electrical conductors used in formation of the alumina ceramic substrate are typically refractory metals such as molybdenum or tungsten.

A typical firing cycle for alumina ceramic substrates is to ramp up to about 900 to 950° C. and hold for a predetermined time, for example 2–3 hours, depending on furnace and product characteristics, to burn off the binder and then raise the temperature to about 1600° C. and hold there for about 1 to 10 hours to accomplish sintering of the alumina ceramic substrate. Thereafter, the temperature is ramped down to room temperature.

As a result of the sintering process, the alumina ceramic substrate undergoes substantial volumetric shrinkage, on the order of 17% or so. The bulk of the shrinkage occurs in the plane of the alumina ceramic substrate, the so-called X and Y dimensions, with the remainder of the shrinkage occurring in the so-called Z direction. It should be understood that the X and Y dimensions in the alumina ceramic substrate must be extremely tightly controlled so that pad-to-pad, via-to-via spacing and other dimensions are within predetermined tolerance. If an alumina ceramic substrate is found to be over tolerance, it may be refired to bring it down into tolerance. On the other hand, if the alumina ceramic substrate has been found to be under tolerance, that is, it has shrunk too much, the alumina ceramic substrate must be scrapped. Such alumina ceramic substrates are often very expensive so it is undesirable to scrap such a part.

It would be desirable to have a method to expand alumina ceramic substrates which have shrunk too much during sintering so that the alumina ceramic substrate need not be scrapped.

Accordingly, it is a purpose of the present invention to have a method to expand alumina ceramic substrates which have shrunk too much during sintering.

It is another purpose of the present invention to have such a method to expand alumina ceramic substrates which is easy to implement in a manufacturing environment.

BRIEF SUMMARY OF THE INVENTION

One aspect of the invention relates to a method of expanding a sintered alumina substrate comprising the step of:

heating the sintered alumina substrate to a temperature of about 1340 to 1380° C. and holding at the temperature for a predetermined time but no less than 15 minutes, the heating step causing the sintered alumina substrate to expand.

A second aspect of the invention relates to a method of expanding a sintered alumina substrate comprising the steps of:

sintering an alumina substrate at a predetermined temperature and for a predetermined time;

determining that the sintered alumina substrate is undersized according to predetermined dimensions; and heating the sintered alumina substrate to a temperature of about 1340 to 1380° C. and holding at the temperature for a predetermined time but no less than 15 minutes, the heating step causing the sintered alumina substrate to expand.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
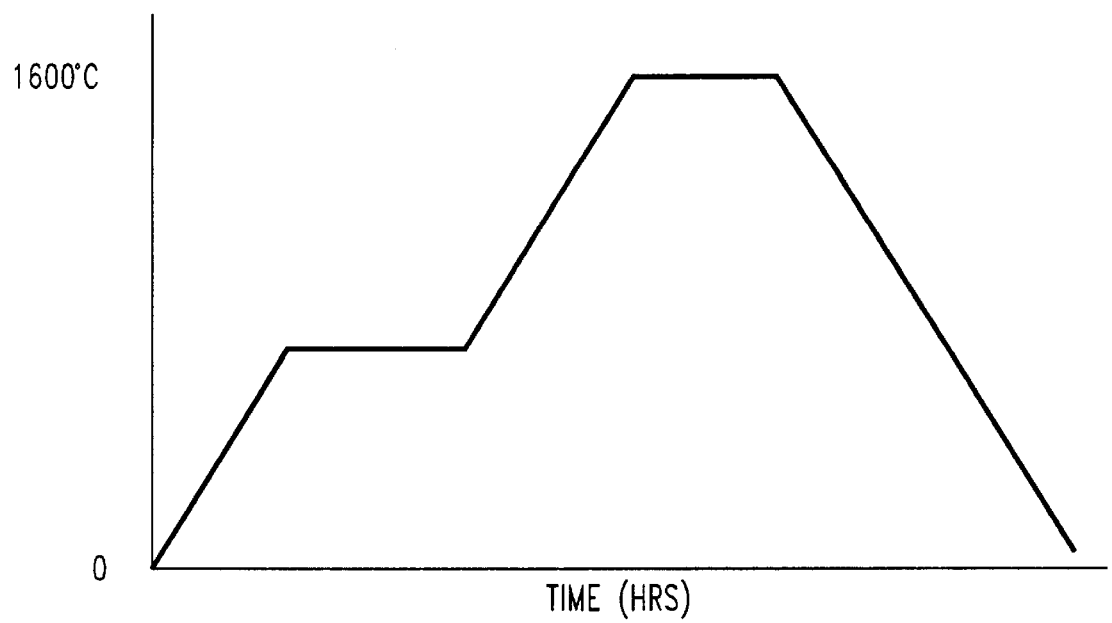
FIG. 1 is a schematical representation of a conventional firing cycle for alumina ceramic substrates.

Referring now to FIG. 1, there is shown a conventional firing cycle for alumina ceramic substrates. It should be understood that ramp-up rates, hold times and temperatures will vary depending on the particular alumina ceramic substrate to be sintered. Generally speaking, the alumina ceramic substrate will be sintered by ramping up to about 900° C. and holding at that temperature for binder burnoff. Then, the temperature will be ramped up to about 1600° C. and held there for about 1 to 10 hours and finally ramped down to room temperature.

After sintering, the alumina ceramic substrate will be measured to determine if it is within tolerance. If the sintered alumina ceramic substrate is oversized, it will be refired for a period of time until it is within tolerance. If the sintered alumina ceramic substrate is undersized, as measured in the XY plane, it will be heat treated according to the present invention.

There is no theoretical limit to the amount of expansion that can be accomplished with the present invention. However, from a practical point of view about 0.25% is the approximate upper limit of expansions.

Figure 2:
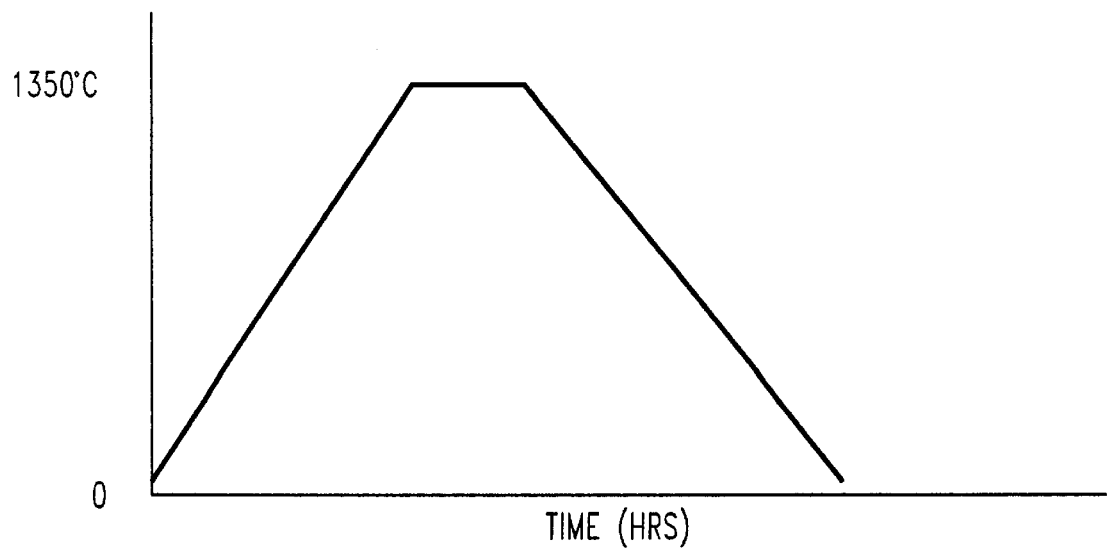
FIG. 2 is a schematical representation of the heat treatment according to the present invention for expanding an alumina ceramic substrate.

Referring now to FIG. 2, an undersized substrate is ramped up to about 1350° C. and held at that temperature for at least 15 minutes so as to cause expansion of the sintered alumina ceramic substrate. The most preferred temperature range is between about 1340° C. and 1380° C., with 1350° C. being the most preferred temperature. The present inventors have found that temperatures more than a few degrees below 1340° C. cause no effect while temperatures above about 1380° C. cause the sintered alumina ceramic substrate to begin to shrink.

The time held at this expansion temperature will depend on the degree of expansion required. That is, the longer the hold time, the greater the expansion as will become apparent hereafter.

A number of sample alpha alumina ceramic substrates were prepared in the conventional manner as described above. The ceramic particulate nominally consisted of, in weight percent, 92% alumina ($Al_2O_3$), 5.8% silica ($SiO_2$), 1.1% magnesia (MgO) and 1.1% calcia (CaO). The samples were sintered in a wet hydrogen atmosphere at 1600° C. for 1 to 10 hours. The samples were ramped down to room temperature and measured.

Figure 3:
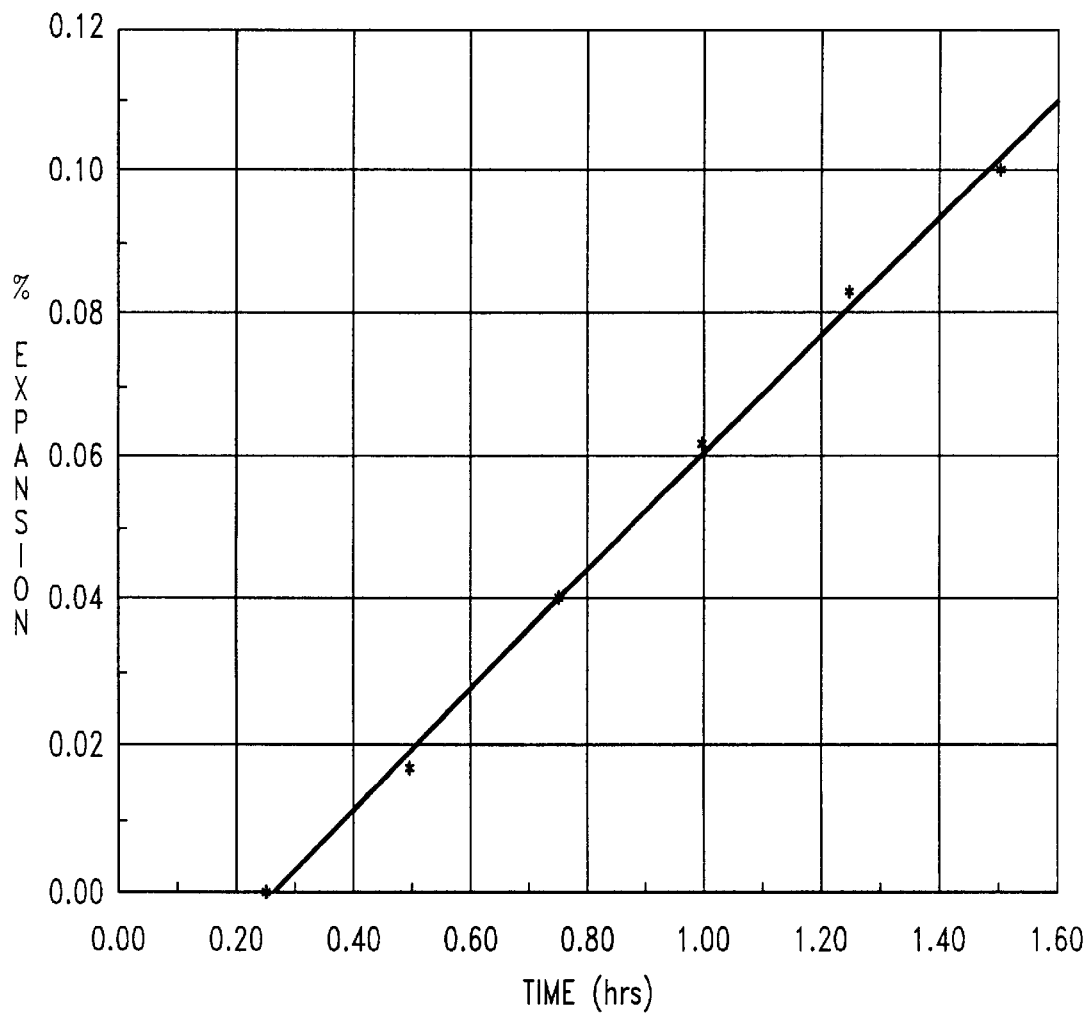
FIG. 3 is a graph of expansion of an alumina ceramic substrate versus time at a hold temperature of 1350° C.

Several of the samples that were undersized were then heat treated according to the present invention. The samples were heated to 1350° C. and held at that temperature for various times. The results are graphed in FIG. 3. As can be seen, there is a linear relationship between the time at temperature and the percent expansion. At 15 minutes, expansion is just beginning while expansion of about 0.1% occurs at 1.5 hours.

Figure 4:
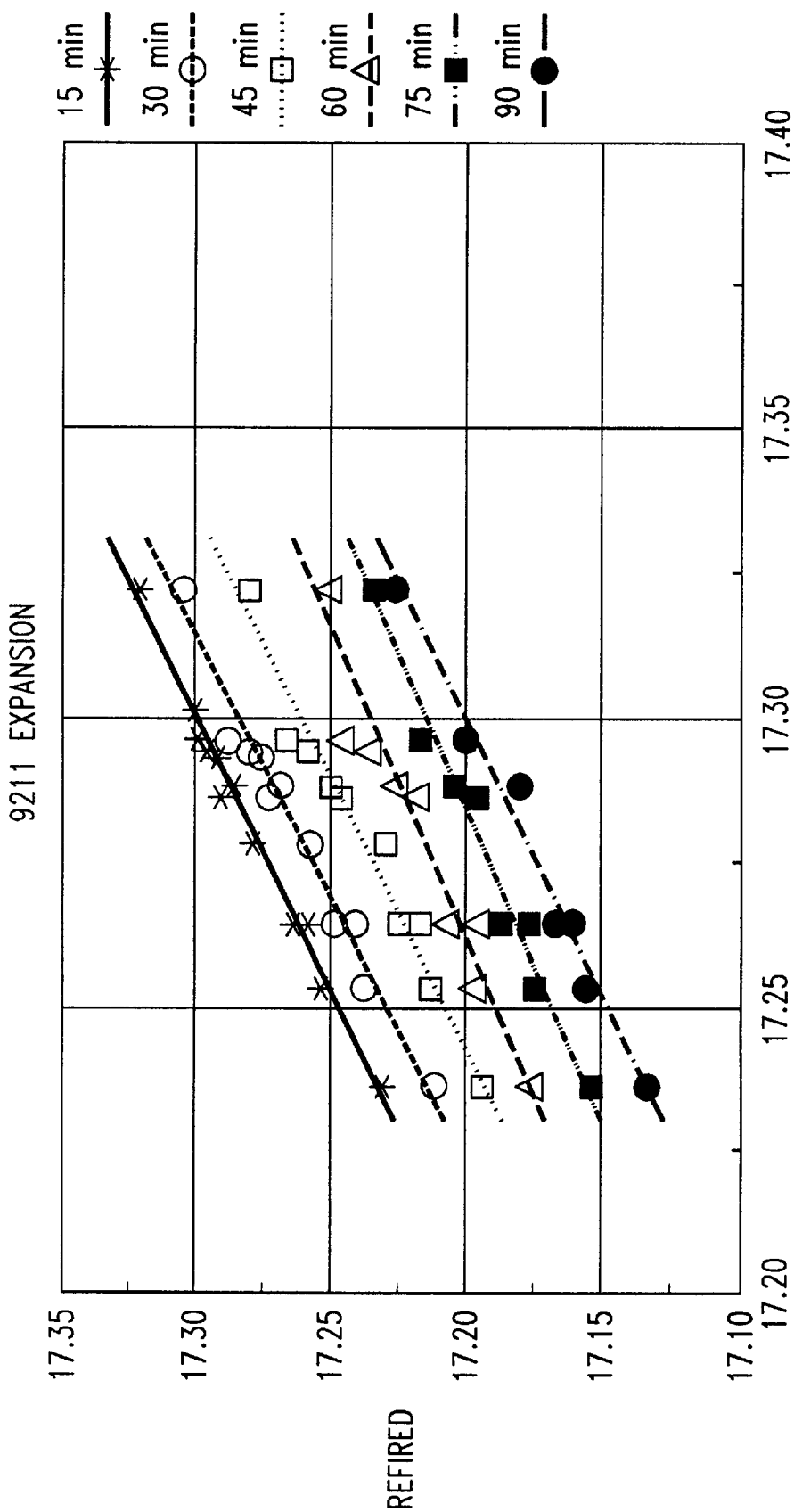
FIG. 4 is a graph of shrinkage of an alumina ceramic substrate before and after the heat treatment at 1350° C. and at various hold times according to the present invention.

Several additional samples that were undersized were heat treated for various times at 1350° C. The results are graphed in FIG. 4. The horizontal axis of the graph indicates the shrinkage after conventional sintering and the vertical axis indicates the shrinkage after the expansion heat treatment according to the present invention. For those samples heat treated for 15 minutes, there was very little change from the "as sintered" shrinkage. However, it can be seen that the longer the samples are heated, the greater the difference between the as sintered shrinkage and the shrinkage obtained after the heat treatment according to the present invention. That is, with increasing time of heat treatment, the as sintered shrinkage decreases resulting in an expansion of the sintered alumina ceramic.

Figure 5:
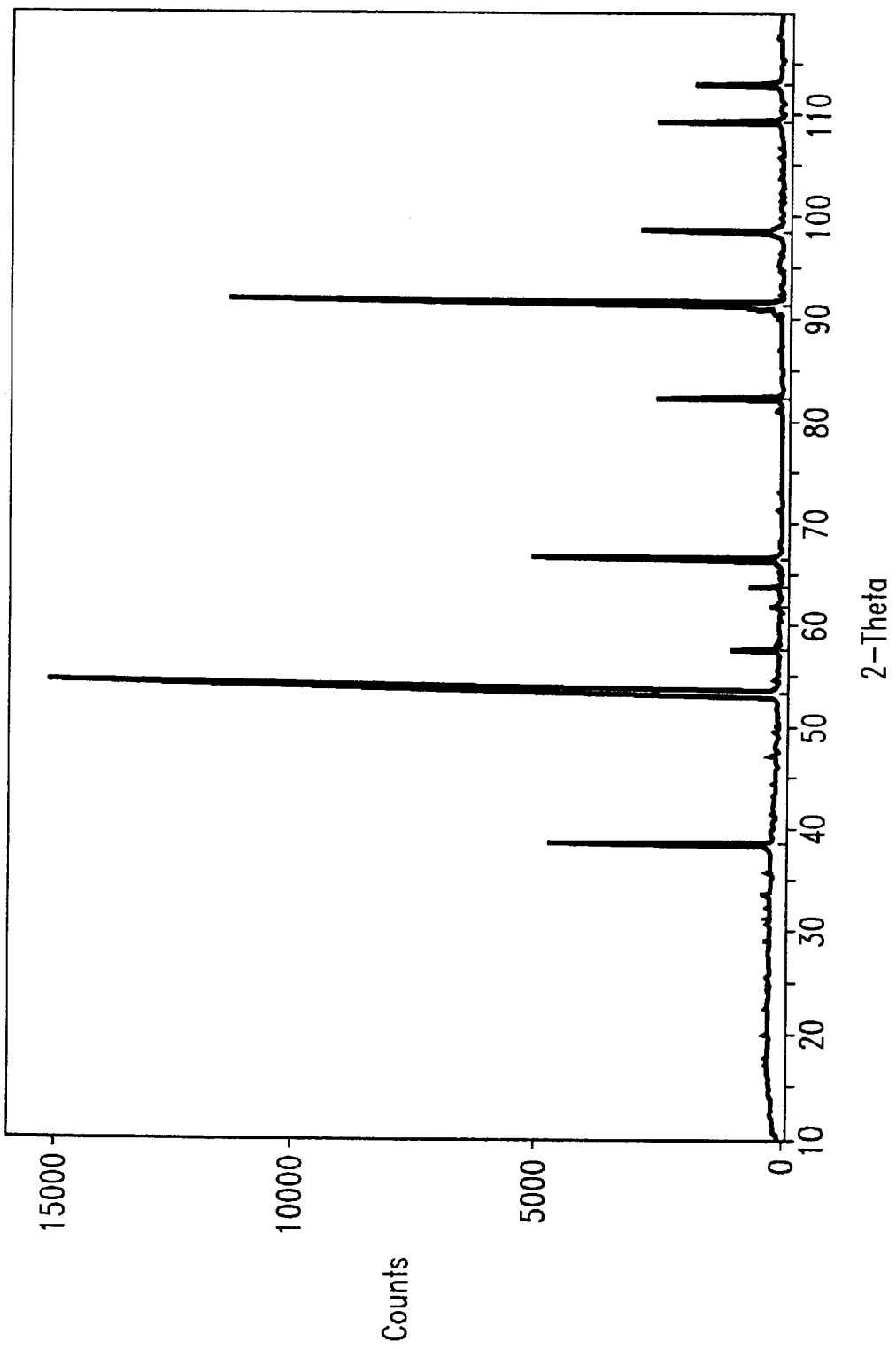
FIG. 5 is an x-ray diffraction analysis showing the structure of an alumina ceramic substrate after a conventional firing cycle.
Figure 6:
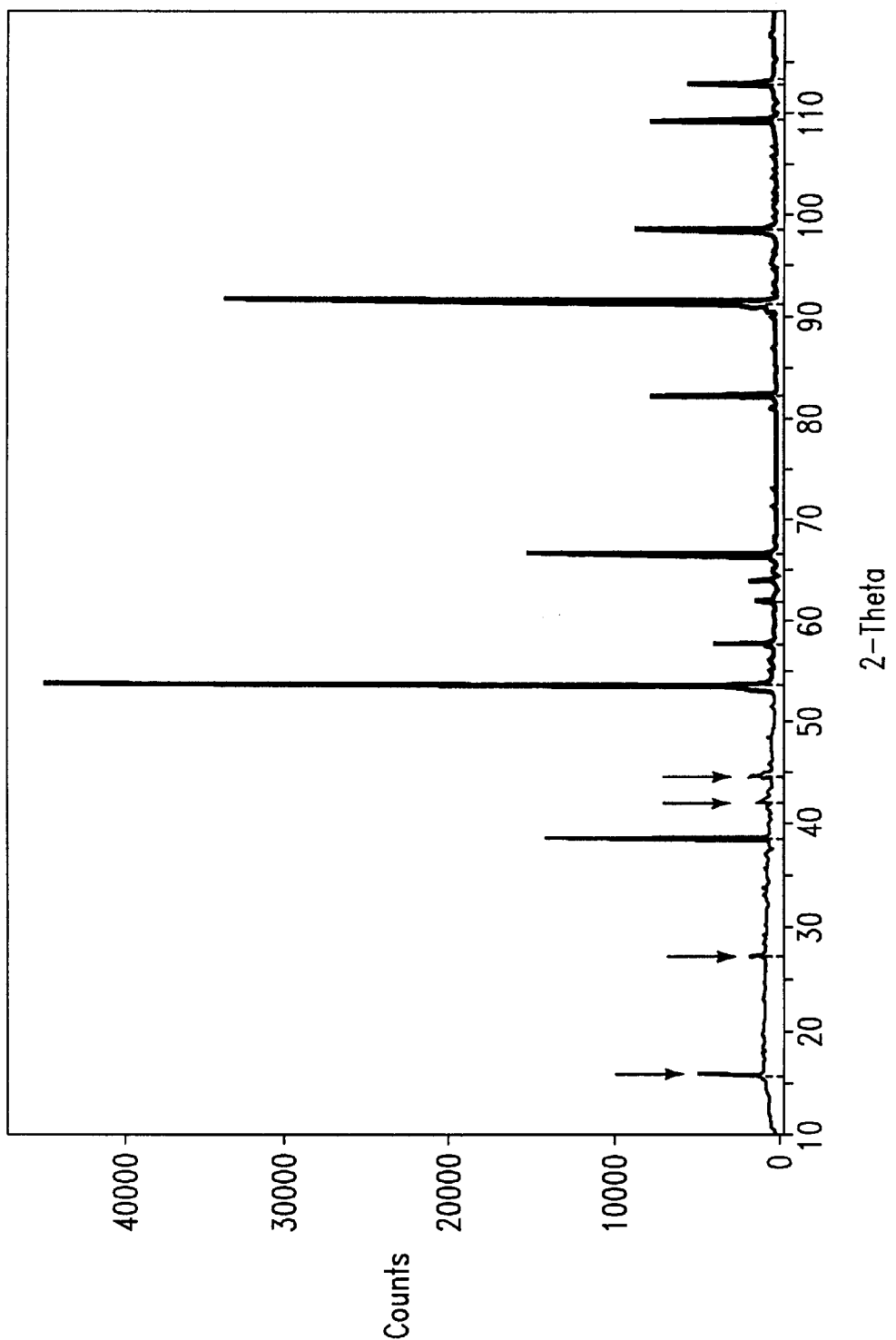
FIG. 6 is an x-ray diffraction analysis showing the structure of the alumina ceramic substrate in FIG. 5 after the heat treatment according to the present invention.

While not wishing to be held to any particular theory, it is believed that the expansion of the sintered alumina ceramic substrate according to the present invention is due to the formation of at least one additional phase. FIG. 5 is an x-ray diffraction pattern of an alumina ceramic substrate sintered according to a conventional firing cycle. FIG. 6 is an x-ray diffraction pattern of the same alumina ceramic substrate refired according to the heat treatment of the present invention at 1350° C. It can be seen that new peaks are present in the x-ray diffraction pattern indicated by arrows. It is believed that these new peaks represent a new phase which has formed resulting in the expansion of the sintered alumina ceramic substrate. If this sintered alumina ceramic substrate were now to be reheated to a temperature above 1380° C., the new peaks will disappear and the substrate will begin to shrink again.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A method of expanding a sintered alpha alumina substrate comprising the steps of:

sintering an alpha alumina substrate at a predetermined temperature and for a predetermined time;

determining that the sintered alpha alumina substrate is undersized according to predetermined dimensions; and heating the sintered alpha alumina substrate to a temperature of about 1340 to 1380° C. and holding at the temperature for a predetermined time but no less than 15 minutes, the heating step causing the sintered alpha alumina substrate to expand a maximum of about 0.25%.

2. The method of claim 1 wherein the sintered alpha alumina substrate is heated to a temperature of about 1350° C.

* * * * *